(12) United States Patent
Ahn et al.

(10) Patent No.: US 11,551,686 B2
(45) Date of Patent: Jan. 10, 2023

(54) HOME APPLIANCE AND METHOD FOR CONTROLLING THEREOF

(71) Applicant: Samsung Electronics Co., Ltd., Suwon-si (KR)

(72) Inventors: Changkyu Ahn, Suwon-si (KR); Minkyong Kim, Suwon-si (KR); Miyoung Yoo, Suwon-si (KR); Hyoungjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 16/859,330

(22) Filed: Apr. 27, 2020

(65) Prior Publication Data
US 2020/0349942 A1  Nov. 5, 2020

(30) Foreign Application Priority Data

Apr. 30, 2019  (KR) .................. 10-2019-0050246

(51) Int. Cl.
| | |
|---|---|
| *G10L 15/22* | (2006.01) |
| *H04L 12/28* | (2006.01) |
| *G10L 25/78* | (2013.01) |
| *G10L 25/87* | (2013.01) |
| *G10L 25/93* | (2013.01) |

(52) U.S. Cl.
CPC ............ *G10L 15/22* (2013.01); *H04L 12/282* (2013.01); *H04L 12/2803* (2013.01); *G10L 25/78* (2013.01); *G10L 25/87* (2013.01); *G10L 25/93* (2013.01); *G10L 2015/223* (2013.01); *G10L 2015/226* (2013.01); *G10L 2015/228* (2013.01);

(Continued)

(58) Field of Classification Search
None
See application file for complete search history.

(56) References Cited

U.S. PATENT DOCUMENTS

| | | | |
|---|---|---|---|
| 8,340,975 B1 * | 12/2012 | Rosenberger | ........... G10L 15/22 |
| | | | 704/274 |
| 9,384,751 B2 * | 7/2016 | Venkatesha | ............. G10L 15/22 |

(Continued)

FOREIGN PATENT DOCUMENTS

| | | |
|---|---|---|
| EP | 2 960 882 A1 | 12/2015 |
| EP | 3 067 884 A1 | 9/2016 |

(Continued)

OTHER PUBLICATIONS

Extended European Search Report dated Jul. 30, 2020, in corresponding European Patent Application No. 20172122.2.

(Continued)

*Primary Examiner* — Richard Z Zhu
(74) *Attorney, Agent, or Firm* — Staas & Halsey LLP

(57) ABSTRACT

A home appliance is provided. The home appliance includes a sensor, a microphone, a speaker, and a processor. The processor is configured to, based on one of a first event wherein a user action is detected through the sensor or a second event wherein a trigger command for initiating a voice recognition mode is input through the microphone occurring, operate in the voice recognition mode, and control the speaker to output an audio signal corresponding to the event occurred, and the audio signal is an audio signal set differently for each of the first event and the second event.

17 Claims, 14 Drawing Sheets

(52) U.S. Cl.
CPC ...... *H04L 12/2816* (2013.01); *H04L 12/2823* (2013.01); *H04L 12/2829* (2013.01)

(56) References Cited

U.S. PATENT DOCUMENTS

| | | | |
|---|---|---|---|
| 9,544,633 B2* | 1/2017 | Lee | H04N 21/41265 |
| 10,102,702 B1* | 10/2018 | Wheeler | G10L 15/22 |
| 10,403,276 B2* | 9/2019 | SaganeGowda | G10L 15/22 |
| 10,436,498 B2 | 10/2019 | Lim et al. | |
| 10,546,023 B2* | 1/2020 | Ni | G06F 16/3334 |
| 10,755,706 B2 | 8/2020 | Huang et al. | |
| 10,796,702 B2 | 10/2020 | Li et al. | |
| 10,896,671 B1* | 1/2021 | Mohajer | G10L 15/222 |
| 11,100,922 B1 | 8/2021 | Mutagi et al. | |
| 11,257,487 B2* | 2/2022 | Casado | G10L 15/00 |
| 2001/0041982 A1 | 11/2001 | Kawasaki et al. | |
| 2003/0161490 A1 | 8/2003 | Maase | |
| 2007/0201639 A1* | 8/2007 | Park | G10L 15/30 |
| | | | 704/E15.047 |
| 2014/0012573 A1* | 1/2014 | Hung | G10L 15/28 |
| | | | 704/E15.039 |
| 2014/0172953 A1* | 6/2014 | Blanksteen | H04W 4/33 |
| | | | 709/203 |
| 2014/0330560 A1* | 11/2014 | Venkatesha | G06F 3/167 |
| | | | 704/235 |
| 2015/0324706 A1* | 11/2015 | Warren | H04L 12/2803 |
| | | | 700/275 |
| 2015/0345065 A1 | 12/2015 | Yang et al. | |
| 2017/0116986 A1* | 4/2017 | Weng | G10L 15/22 |
| 2017/0212590 A1* | 7/2017 | VanBlon | G06F 3/167 |
| 2019/0362608 A1 | 11/2019 | Horling | |
| 2020/0043494 A1 | 2/2020 | Maeng | |
| 2022/0148595 A1* | 5/2022 | Ni | G10L 15/18 |

FOREIGN PATENT DOCUMENTS

| | | |
|---|---|---|
| KR | 10-2017-0028238 | 3/2017 |
| KR | 10-2018-0046780 | 5/2018 |
| KR | 10-1994693 | 7/2019 |

OTHER PUBLICATIONS

Notice of Allowance dated Oct. 27, 2021, in co-pending application U.S. Appl. No. 17/352,722.
U.S. Appl. No. 17/352,722, filed Jun. 212021, Changkyu Ahn, Samsung Electronics Co., Ltd.
European Search Report dated Jul. 8, 2021, in European Patent Application No. 21168201.8.

* cited by examiner

FIG. 6
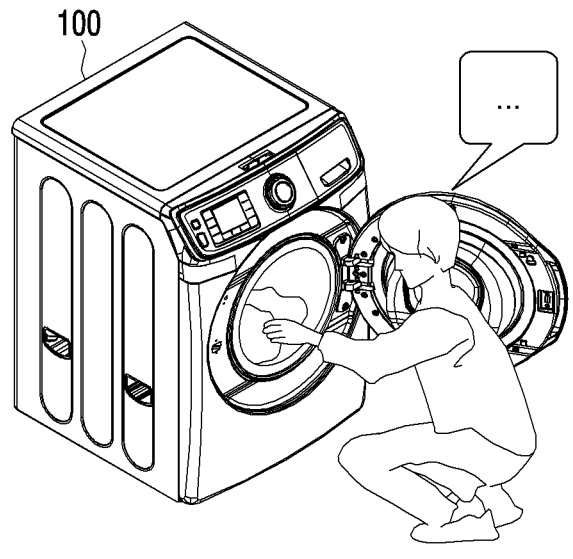
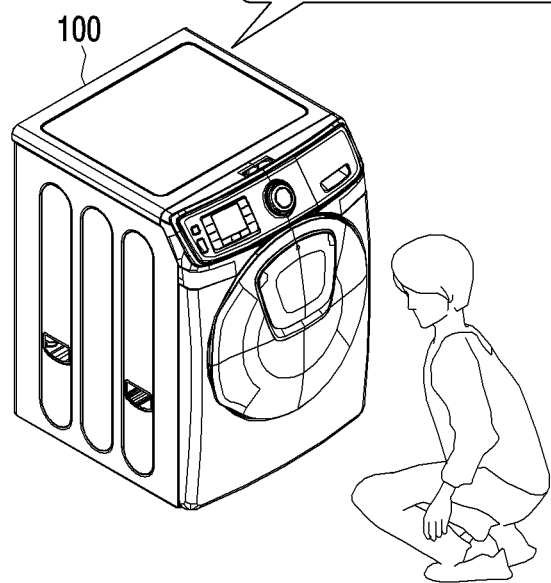

FIG. 8
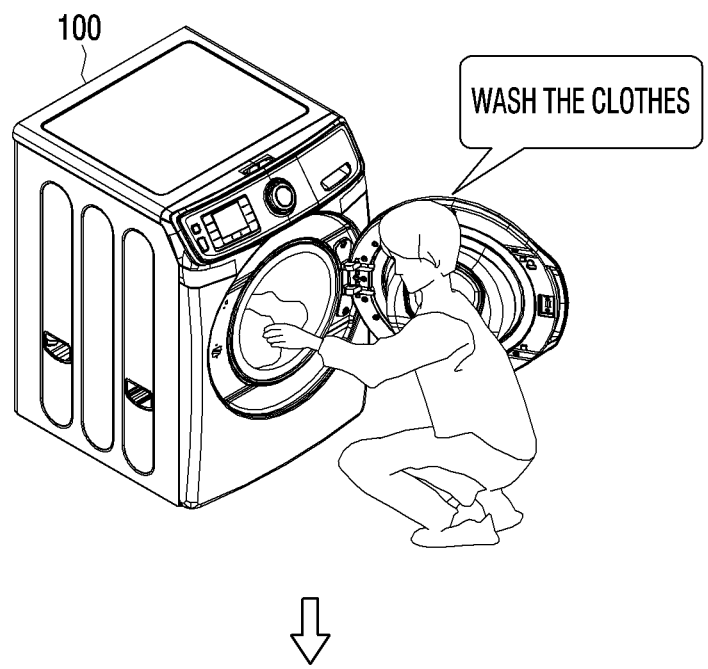
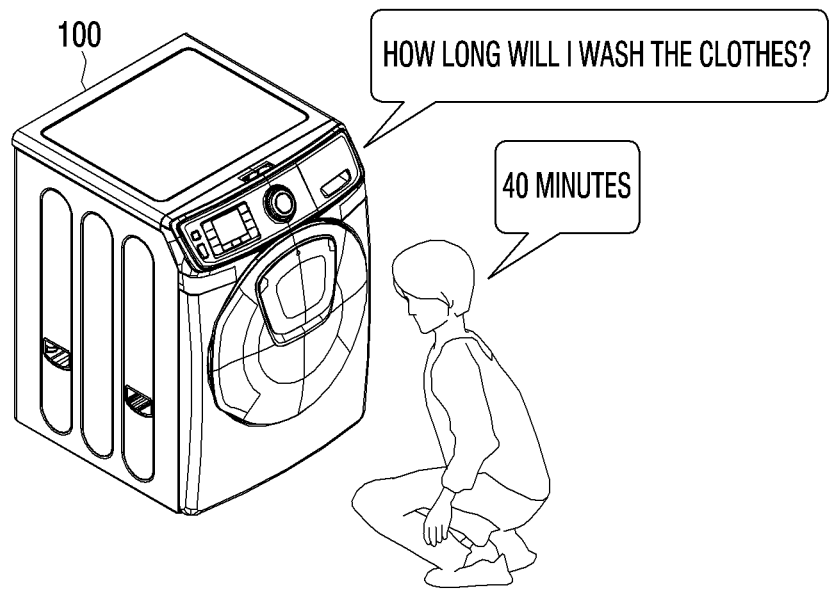

FIG. 9

| No | Voice ID | FUNCTION |
|---|---|---|
| 1 | MOTHER | PREHEATING. BAKING. |
| 2 | FATHER | PREHEATING. BAKING. |
| 3 | BABY | – |

HOME APPLIANCE AND METHOD FOR CONTROLLING THEREOF

CROSS-REFERENCE TO RELATED APPLICATION(S)

This application is based on and claims priority under 35 U.S.C. § 119(a) of a Korean patent application number 10-2019-0050246, filed on Apr. 30, 2019, in the Korean Intellectual Property Office, the disclosure of which is incorporated by reference herein in its entirety.

BACKGROUND

1. Field

The disclosure relates to a home appliance and a method for controlling thereof, and more particularly, to a home appliance which operates in a voice recognition mode if an event that a user action is detected occurs, and a method for controlling thereof.

2. Description of Related Art

A home appliance can perform various functions according to a control command of a user. For recent home appliances, not only a function of receiving input of a control command through input devices such as a keypad and a remote control, but also a voice recognition function of receiving input of a control command through a user voice is being adopted.

In particular, there is a growing number of home appliances which, if a user utters a trigger command initiating a voice recognition function (e.g., Bixby), detect the trigger command and operate in a voice recognition mode.

SUMMARY

The purpose of the disclosure is in providing a home appliance which operates in a voice recognition mode if an event that a user action is detected occurs, and a method for controlling thereof.

A home appliance according to an embodiment of the disclosure includes a sensor, a microphone, a speaker, and a processor. The processor may, based on one of a first event wherein a user action is detected through the sensor or a second event wherein a trigger command for initiating a voice recognition mode is input through the microphone occurring, operate in the voice recognition mode, and control the speaker to output an audio signal corresponding to the event occurred, and the audio signal may be an audio signal set differently for each of the first event and the second event.

Meanwhile, a method for controlling a home appliance according to an embodiment of the disclosure includes the steps of, based on one of a first event wherein a user action is detected or a second event wherein a trigger command for initiating a voice recognition mode is input occurring, outputting an audio signal corresponding to the event occurred, and operating in the voice recognition mode. Also, the audio signal may be an audio signal set differently for each of the first event and the second event.

Meanwhile, in a recording medium storing a program for executing a method for controlling a home appliance according to an embodiment of the disclosure, the controlling method includes the steps of, based on one of a first event wherein a user action is detected or a second event wherein a trigger command for initiating a voice recognition mode is input occurring, outputting an audio signal corresponding to the event occurred, and operating in the voice recognition mode. Also, the audio signal may be an audio signal set differently for each of the first event and the second event.

BRIEF DESCRIPTION OF THE DRAWINGS

FIG. 6 is a diagram for illustrating a method for initiating a voice recognition mode according to the second embodiment of the disclosure;

FIG. 8 is a diagram for illustrating a method for converting to a standby mode according to the second embodiment of the disclosure;

FIG. 9 is a diagram illustrating examples of authority information of each of a plurality of users;

DETAILED DESCRIPTION

Figure 1:
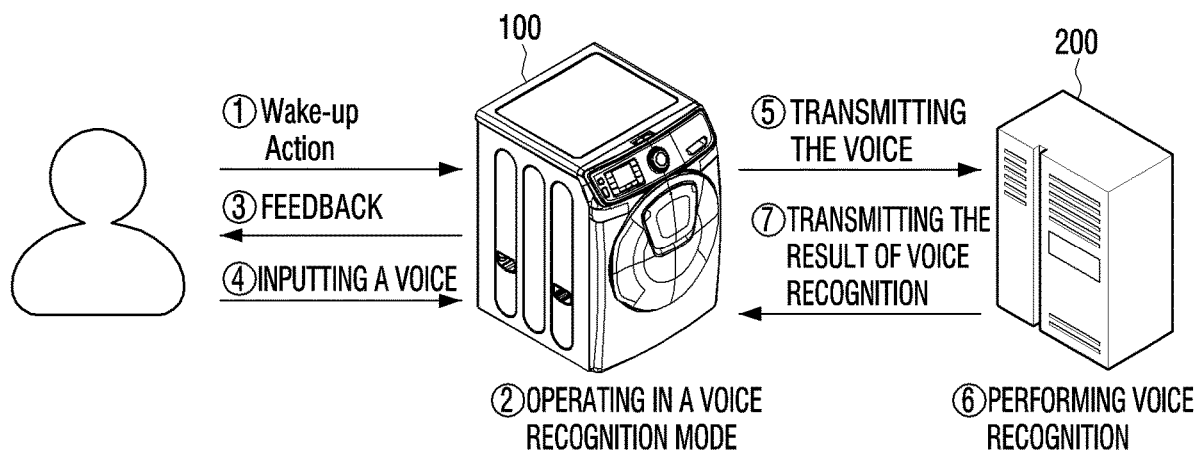
FIG. 1 is a diagram for illustrating a voice recognition system according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in particular cases, there may be terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the ideas and the technical scopes disclosed herein. Meanwhile, in case it is determined that in describing embodiments, detailed explanation of related known technologies may unnecessarily confuse the gist of the disclosure, the detailed explanation will be omitted.

In addition, terms such as "first," "second," and the like may be used to describe various elements, but the terms are not intended to limit the elements. Such terms are used only to distinguish one element from another element.

Meanwhile, singular expressions include plural expressions, unless defined obviously differently in the context. Further, in the disclosure, terms such as "include" and "have" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly.

Hereinafter, the disclosure will be described in more detail with reference to the drawings.

FIG. 1 is a diagram for illustrating a voice recognition system according to an embodiment of the disclosure.

Referring to FIG. 1, the voice recognition system 1000 includes a home appliance 100 and a server 200.

The home appliance 100 may be a refrigerator, a washing machine, an oven, a microwave oven, etc., and it may be a different device other than the aforementioned devices as well as the aforementioned devices, only if it supports a voice recognition mode.

The home appliance 100 may detect a wake-up action ①. Here, a wake-up action means an event wherein there is a possibility that a user utters a control command, an inquiry, or a response. For example, utterance of a trigger command by a user or opening and closing of the door of the home appliance 100, etc. may fall under a wake-up action.

Also, the home appliance 100 may operate in a voice recognition mode ②. Then, the home appliance 100 may perform a feedback informing that the voice recognition mode was initiated ③. Specifically, the home appliance 100 may output an audio signal informing that the voice recognition mode was initiated.

Here, an audio signal may be set differently according to the event occurred. Specifically, in case an event wherein a trigger command was detected occurred, a simple alarming sound informing that the voice recognition mode was initiated may be output, and in case an event wherein a user action was detected occurred, a voice message specifically informing that the voice recognition mode was initiated may be output.

Then, the home appliance 100 may receive input of a user voice uttered by the user ④. Also, the home appliance 100 may transmit the input user voice to the server 200 ⑤.

The server 200 means a computer (server computer) or a program (server program) providing information or services to a client through a network.

Then, the server 200 may perform voice recognition for the input voice ⑥. Specifically, the server 200 may perform voice recognition for the input voice by using a voice recognition module. Then, the server 200 may transmit the result of voice recognition to the home appliance ⑦.

Then, the home appliance 100 may perform an operation corresponding to the result of voice recognition. Meanwhile, before performing an operation, the home appliance 100 may check to the user who uttered the voice whether the user has authority for the operation, and if authority is checked, the home appliance 100 may perform the operation. A detailed operation in this regard will be described later with reference to FIG. 3.

Meanwhile, in illustrating and describing FIG. 1, it was illustrated and described that the voice recognition system includes one home appliance and one server, but in actual implementation, the voice recognition system may be implemented to include a plurality of home appliances or a plurality of servers.

Also, in illustrating and describing FIG. 1, it was illustrated and described that the voice recognition system includes a server, but in actual implementation, in case the home appliance is designed to be able to perform all functions of a server, the voice recognition system may be implemented to not include a server.

Figure 2:
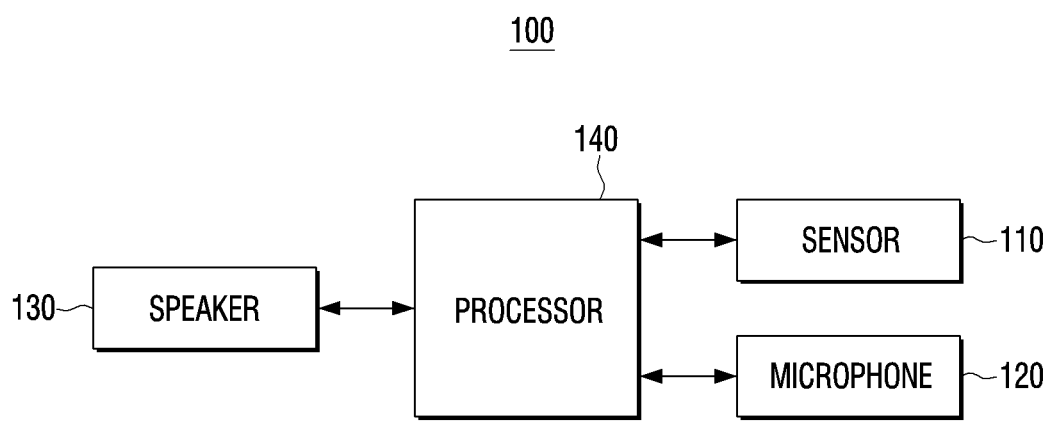
FIG. 2 is a block diagram illustrating a schematic configuration of a home appliance according to an embodiment of the disclosure.

FIG. 2 is a block diagram illustrating a schematic configuration of a home appliance according to an embodiment of the disclosure.

Referring to FIG. 2, the home appliance 100 includes a sensor 110, a microphone 120, a processor 140, and a speaker 130.

The sensor 110 detects a user action. Specifically, the sensor 110 may detect a user action for the home appliance 100.

For example, in case the sensor 110 is a sensor detecting opening and closing of the door (not shown) provided on the main body of the home appliance 100, the sensor 110 may detect opening or closing of the door by the user and output a corresponding value. In this case, the sensor 110 may be implemented as a switch, and if the switch is turned on, output a value corresponding to closing of the door, and if the switch is turned off, output a value corresponding to opening of the door.

As another example, in case the sensor 110 is a motion detection sensor, the sensor 110 may detect a user access for the home appliance 100. In this case, the sensor 110 may be implemented as an IR sensor, a proximity sensor, a thermal image sensor, or a camera, etc. As still another example, in case the sensor 110 is a touch detection sensor, the sensor 110 may detect a user touch for the home appliance 100.

Meanwhile, the types of the sensor 110 are not limited to the aforementioned examples, and may be different according to the type or model of the home appliance 100. Also, there may be a plurality of sensors 110.

The microphone 120 may receive input of a voice. Specifically, the microphone 120 may receive input of a voice uttered by a user and convert the voice to voice data that can be processed at the home appliance 100. Then, the microphone 120 may transmit the converted voice data to the processor 140.

Meanwhile, in the illustrated embodiment, it was described that the microphone 120 is installed inside the home appliance 100, but in actual implementation, the microphone may be implemented as an external device of the home appliance. That is, the microphone may be implemented as a form of receiving a voice signal from an external microphone and using the voice signal.

The speaker 130 may be provided inside the home appliance 100 and output a sound to the outside of the home appliance 100. Specifically, the speaker 130 may convert an audio signal to a sound according to control of the processor 140 and output the sound.

The processor 140 controls the home appliance 100. Specifically, the processor 140 may control each component of the home appliance 100 according to a control command of a user. For example, in case the home appliance 100 is a washing machine, if the processor 140 receives a spin-drying command, the processor 140 may control the operation of the motor to provide rotational force to the drum accommodating laundry.

Also, the processor 140 may operate in a voice recognition mode. Here, a voice recognition mode means an operation mode wherein the processor 140 processes a user's inquiry and response input through the microphone 120 as a natural language. Here, the processor 140 may be implemented in a manner of directly processing a user's inquiry and response as a natural language by using a voice recognition module. Also, the processor 140 may be implemented in a manner of transmitting a voice input through the microphone 120 to the server and receiving the result of voice recognition from the server. Meanwhile, detailed explanation regarding the voice recognition module will be made later with reference to FIG. 4.

Specifically, if a predetermined event occurs, the processor 140 may operate in the voice recognition mode. Here, a predetermined event means an event wherein there is a possibility that a user utters a control command, an inquiry, or a response.

For example, a predetermined event may be an event wherein a user utters a trigger command for initiating the voice recognition mode, and the voice including the trigger command is input through the microphone 120. In this case, the processor 140 may identify whether a trigger command is included in voice data acquired through the microphone 120 by using a trigger command detection model, and if it is identified that a trigger command is included, the processor 140 may operate in the voice recognition mode. Meanwhile, a trigger command may be referred to as a wake-up command or a starting command, etc.

As another example, a predetermined event may be an event wherein a user action is detected through the sensor 110. In this case, if a user action is detected through the sensor 110, the processor 140 may operate in the voice recognition mode. Here, a user action may be set differently according to the type of the sensor 110.

If the sensor 110 is a sensor for detecting opening and closing of the door provided on the main body of the home appliance 100, when opening or closing of the door is detected through the sensor 110, the processor 140 may operate in the voice recognition mode. Meanwhile, the processor 140 may be implemented in a manner of operating in the voice recognition mode only when opening of the door is detected through the sensor 110, or in a manner of operating in the voice recognition mode only when closing of the door is detected. A detailed operation in this regard will be described later with reference to FIGS. 5 and 6.

In contrast, in case the sensor 110 is a motion detection sensor, the processor 140 may operate in the voice recognition mode if a user access for the home appliance 100 is detected through the sensor 110.

As described above, if a trigger command for initiating the voice recognition mode is input through the microphone 120 or a user action is detected through the sensor 110, the processor 140 may operate in the voice recognition mode.

Also, when the processor 140 operates in the voice recognition mode, the processor 140 may control the speaker 130 to output an audio signal informing that the processor 140 operates in the voice recognition mode.

Specifically, when a predetermined event occurs and the processor 140 operates in the voice recognition mode, the processor 140 may control the speaker 130 to output audio signals corresponding to each predetermined event.

To be more specific, if a trigger command is input through the microphone 120 and the processor 140 operates in the voice recognition mode, the processor 140 may control the speaker 130 to output a first audio signal. Also, if a user action is detected through the sensor 110 and the processor 140 operates in the voice recognition mode, the processor 140 may control the speaker 130 to output a second signal different from the first audio signal.

Here, the first audio signal may be a simple alarming sound. In case a user uttered a trigger command, the user intended the voice recognition mode of the home appliance 100, and thus the alarming sound is for simply informing that the home appliance 100 operates in the voice recognition mode, and at the same time, for inducing the user to continuously utter a control command or an inquiry immediately without waiting.

Meanwhile, the second audio signal may be a voice message informing that the voice recognition mode was initiated (e.g., "What can I help you with?"). This is for specifically informing that the home appliance 100 operates in the voice recognition mode and at the same time, for inducing the user to utter a control command or an inquiry, as it is uncertain if the user intended the voice recognition mode of the home appliance 100 even if a user action is detected.

Then, the processor 140 may perform voice recognition for the voice input through the microphone 120. Specifically, after the processor 140 started to operate in the voice recognition mode, the processor 140 may perform voice recognition for the voice input through the microphone 120.

Here, the processor 140 may perform voice recognition by using the voice recognition module provided on the home appliance 100. Alternatively, the processor 140 may perform voice recognition in a manner of transmitting voice data corresponding to the input voice to an external server (not shown), and receiving the result of voice recognition for the transmitted voice data.

Then, the processor 140 may perform an operation corresponding to the result of voice recognition. For example, in case the home appliance 100 is a washing machine, and the result of voice recognition is "washing for 30 minutes," the processor 140 may control the home appliance 100 to perform a washing operation for 30 minutes.

Figure 3:
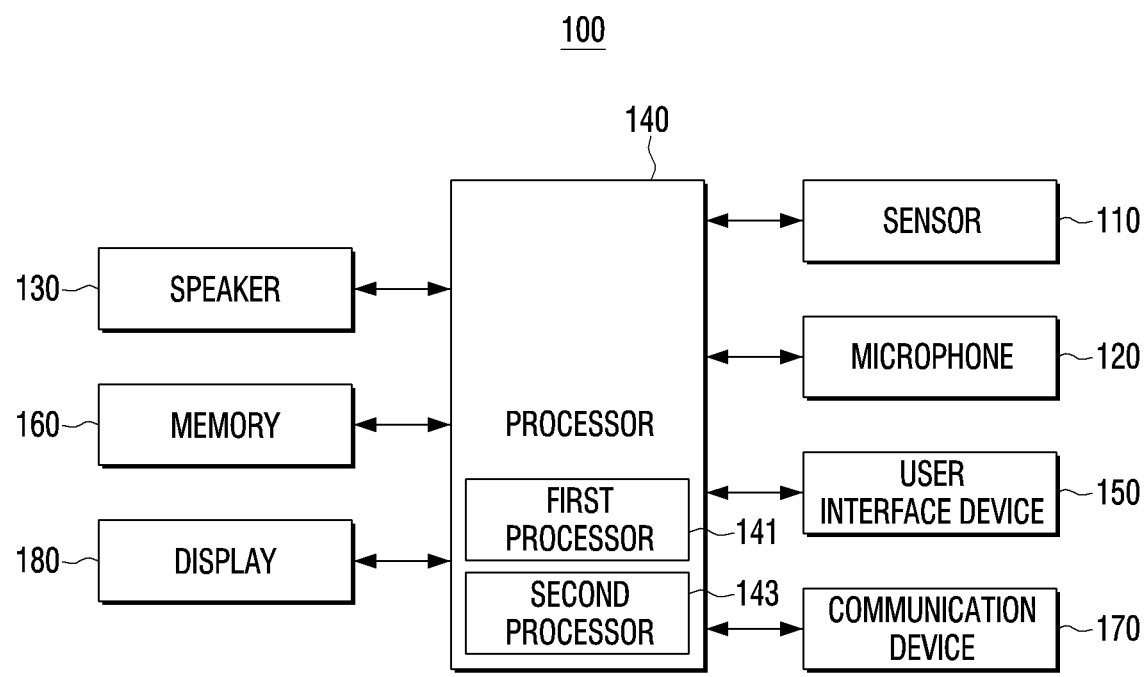
FIG. 3 is a block diagram illustrating a detailed configuration of a home appliance according to an embodiment of the disclosure.

In the above, only the schematic configuration of the home appliance 100 was described, but the home appliance 100 may additionally include the components as illustrated in FIG. 3. The detailed configuration of the home appliance 100 will be described below with reference to FIG. 3.

Referring to FIG. 3, it is a block diagram illustrating a detailed configuration of a home appliance according to an embodiment of the disclosure.

Referring to FIG. 3, the home appliance 100 according to an embodiment of the disclosure may consist of a sensor 110, a microphone 120, a speaker 130, a processor 140, a user interface device 150, a memory 160, a communication device 170, and a display 180.

As the configurations of the sensor 110, the microphone 120, and the speaker 130 are identical to the configurations in FIG. 2, overlapping explanation will be omitted. Also, as the processor 140 was described with reference to FIG. 2, the contents described in FIG. 2 will not be repetitively described, but only the contents related to the components added in FIG. 3 will be described below.

The processor 140 may include a plurality of processors 141, 143. Specifically, the processor 140 may include a first processor 141 for detecting a trigger command and a second processor 143 for operating in the voice recognition mode.

The first processor 141 may maintain a turned-on state in a standby state. Here, a standby state means a state wherein the first processor 141 detects whether a predetermined event occurred to initiate an operation in the voice recognition mode. Also, when a user voice including a trigger command is input through the microphone 120, the first processor 141 may output an alarming signal to the second processor 143.

The first processor 141 as described above may be included in an audio chipset (not shown) that converts an analog acoustic signal to a digital acoustic signal or converts a digital acoustic signal to an analog acoustic signal.

Meanwhile, the second processor 143 may maintain a turned-off state in a standby state. Specifically, when a standby state is maintained for over a predetermined time period, the state of the second processor 143 may be changed from a turned-on state to a turned-off state and the state may be maintained. Also, when the second processor 143 receives an alarming signal output from the first processor 141, the second processor 143 may be turned on and operate in the voice recognition mode.

The user interface device 150 is a component for receiving input of a user interaction such as a user manipulation. Specifically, the user interface device 150 may receive input of various control commands for the home appliance 100 from a user. For example, in case the home appliance 100 is a washing machine, the user interface device 150 may input a spin-drying command of the washing machine from a user.

The user interface device 150 may include buttons formed in any areas of the home appliance 100 such as the front surface, side surface, or rear surface of the exterior of the main body or a light reception device that receives a light signal corresponding to a user input (e.g., a touch, a push, a touch gesture, a voice, or a motion) from a remote control device. Meanwhile, if the display 180 is a touch screen, the display 180 may also operate as the user interface device 150.

The user interface device 150 may receive input of a decision regarding whether to activate each predetermined event from a user.

Specifically, the user interface device 150 may receive input of a decision regarding whether to activate each of an event wherein a trigger command for initiating the voice recognition mode is input through the microphone 120 or an event wherein a user action is detected through the sensor 110.

Then, when a predetermined event occurs, the processor 140 may operate in the voice recognition mode according to the result of the input. Specifically, in case the processor 140 received input of activation of a predetermined event, the processor 140 may operate in the voice recognition mode when the predetermined occurs. However, in case the processor 140 received input of inactivation of a predetermined event, the processor 140 may not operate in the voice recognition mode even if the predetermined event occurs.

For example, in case the user interface device 150 received input of inactivation of an event wherein a trigger command for initiating the voice recognition mode is input through the microphone 120, the processor 140 may not operate in the voice recognition mode even if a trigger command is input through the microphone 120.

As another example, in case the user interface device 150 received input of inactivation of an event wherein a user action is detected through the sensor 110, the processor 140 may not operate in the voice recognition mode even if a user action is detected through the sensor 110.

Also, if inactivation of a predetermined event is input, the processor 140 may perform an additional operation according to what the inactivated predetermined event is.

Specifically, if inactivation of an event wherein a trigger command for initiating the voice recognition mode is input through the microphone 120 is input, the processor 140 does not need to perform detection of the trigger command. Accordingly, the processor 140 may reduce power consumption by turning off the microphone 120 in the standby state of the home appliance 100.

Here, in case activation is executed for an event wherein a user action is detected through the sensor 110, if a user action is detected through the sensor 110, the processor 140 may turn on the microphone 120 again for an operation in the voice recognition mode, and execute the voice recognition module.

In contrast, in case inactivation of an event wherein a user action is detected through the sensor 110 is input, the processor 140 does not need to detect a user action. Accordingly, the processor 140 may reduce power consumption by turning off the sensor 110 detecting a user action in the standby state.

Here, in case activation is executed for an event wherein a trigger command is input through the microphone 120, the processor 140 may maintain a turned-on state of the microphone 120 in the standby state for detection of a trigger command.

The memory 160 stores various kinds of data for the overall operations of the home appliance 100 such as programs for processing or control of the processor 140. Specifically, the memory 160 may store several application programs driven in the home appliance 100, and data and commands for the operations of the home appliance 100.

Also, the memory 160 may be accessed by the processor 140, and reading/recording/correction/deletion/update, etc. of data by the processor 140 may be performed. Such a memory 160 may be implemented not only as a storage medium inside the home appliance 100, but also as an external storage medium, a removable disk including a USB memory, a web server through a network, etc.

In addition, the memory 160 may store a voice recognition module. Also, the processor 140 may use the voice recognition module for generating a natural language as a response to a user utterance. The voice recognition module may be executed by a conventional generic-purpose processor (e.g., a CPU) or a separate AI-dedicated processor (e.g., a GPU, etc.). Explanation in this regard will be made later with reference to FIG. 4.

Further, the memory 160 may store a speaker recognition model. Here, a speaker recognition model means a model which uses vocal print information included in a voice input through the microphone 120 and vocal print information of a pre-registered user, and identifies a user corresponding to the current speaker among pre-registered users.

Then, the processor 140 may perform a speaker recognition function of identifying a user corresponding to the voice input through the microphone 120 by using the speaker recognition model stored in the memory 160.

The memory 160 may store authority information of each user. Specifically, the memory 160 may store authority information for each of a plurality of operations of the home appliance 100 by each of a plurality of users.

Then, if a user voice is input through the microphone 120, the processor 140 may identify the user voice and recognize the user, and if the operation of the home appliance 100 corresponding to the user voice matches the authority information of the recognized user, the processor 140 may perform the operation of the home appliance 100 corresponding to the user voice.

To be more specific, the processor 140 may recognize a user by using a user voice input through the microphone 120 in the voice recognition mode and the speaker recognition model stored in the memory 160. Then, the processor 140 may identify whether the operation of the home appliance 100 (e.g., a washing operation) corresponding to the user voice matches the authority information of the recognized user by using the authority information of the user stored in the memory 160, and if the operation matches the authority, the processor 140 may perform the operation of the home appliance 100 corresponding to the user voice.

Meanwhile, in case a user corresponding to a user voice input through the microphone 120 is not recognized, or a recognized user does not have authority for the operation of the home appliance 100 corresponding to the user voice, the processor 140 may not perform the operation of the home appliance 100 corresponding to the user voice.

The detailed operation in this regard will be described later with reference to FIGS. 9 and 10.

The communication device 170 performs communication with various types of external devices according to various types of communication methods. Specifically, the communication device 170 may perform communication with another home appliance, or perform communication with an external network (e.g., the Internet, a server, etc.). For such operations, the communication device 170 may include a Wi-Fi chip and a Bluetooth chip.

For example, the communication device 170 may perform communication with another home appliance in an adjacent location by using a Bluetooth chip, or perform communication with an external server through a Wi-Fi chip.

In case the home appliance 100 performs a voice recognition function by using an external server, the communication device 170 may transmit voice data regarding a voice input through the microphone 120 to an external server, and receive the result of voice recognition from the external server.

Meanwhile, in case the home appliance 100 performs a speaker recognition function by using an external server, the communication device 170 may transmit voice data regarding a voice input through the microphone 120 to an external server, and receive the result of speaker recognition from the external server.

Then, the processor 140 may identify whether the user has authority by using the received result of speaker recognition (i.e., user information corresponding to the voice data) and pre-stored authority information regarding a plurality of operations of the home appliance 100 by each of a plurality of users, and if authority is identified, the processor 140 may perform a function corresponding to the result of voice recognition.

The display 180 may display various kinds of information provided at the home appliance 100. Specifically, the display 180 may display the operation state of the home appliance 100, or display a user interface window for selection of an operation selected by a user and an option.

For example, the display 180 may display a result of performing a voice recognition function, or display an interface window so that a user can change the setting for a voice recognition function.

In the past, a home appliance operated in the voice recognition mode only when a trigger command was included in a user voice input through a microphone, and thus there was a problem that a user necessarily had to utter a trigger command before uttering a voice command.

In contrast, as described above, a home appliance according to an embodiment of the disclosure operates in the voice recognition mode if a user action by which it is predicted that a user is going to utter a voice command is detected, even if a user does not utter a trigger command, and accordingly, the home appliance has an effect of resolving inconvenience that a user necessarily has to utter a starting command.

Also, a home appliance according to an embodiment of the disclosure outputs a voice message informing that the voice recognition mode is initiated when a user action is detected, and can thereby specifically inform that the home appliance operates in the voice recognition mode even when it is uncertain whether a user intended the voice recognition mode of the home appliance, and induce a user to utter a control command or an inquiry.

In addition, a home appliance according to an embodiment of the disclosure turns off the microphone in a standby state if an event wherein a trigger command is detected is inactivated, and turns off the sensor in a standby state if an event wherein a user action is detected is inactivated, and can thereby reduce power consumed for unnecessary components in a standby state.

Figure 4:
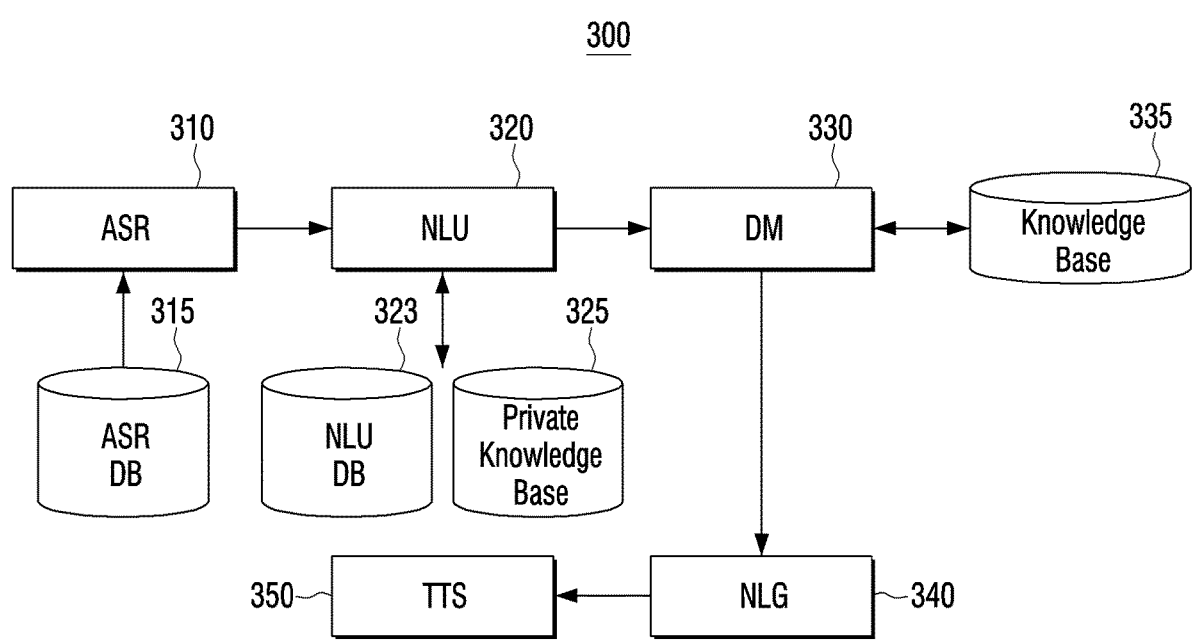
FIG. 4 is a block diagram illustrating a voice recognition module according to an embodiment of the disclosure.

FIG. 4 is a block diagram illustrating a voice recognition module according to an embodiment of the disclosure.

Operations in the voice recognition mode according to an embodiment of the disclosure may be performed by using the voice recognition module 300 as illustrated in FIG. 4. According to an embodiment of the disclosure, the voice recognition module 300 may be stored inside the memory 160 of the home appliance 100. However, this is merely an example, and at least one of the modules included in the voice recognition module 300 may be included in at least one server outside.

The voice recognition module 300 may include an automatic speech recognition (ASR) module 310, a natural language understanding (NLU) module 320, a dialogue manger (DM) module 330, a natural language generator (NLG) module 340, and a text to speech (TTS) module 350, as illustrated in FIG. 4.

The automatic speech recognition module (ASR) module 310 may convert a user voice received from the home appliance 100 to text data. Also, the automatic speech recognition module 310 may include an utterance recognition module, and the utterance recognition module may include an acoustic model and a language model. In particular, the acoustic model may acquire information regarding the acoustic characteristics of a user voice.

The natural language understanding module 320 may identify a user intent by performing syntactic analysis or semantic analysis.

Also, the natural language understanding module 320 may perform syntactic analysis by dividing a user input into syntactic units (e.g.: words, phrases, morphemes, etc.), and identifying which syntactic elements the divided units have.

In addition, the natural language understanding module 320 may perform semantic analysis by using semantic matching, rule matching, formula matching, etc. Accordingly, the natural language understanding module 320 may acquire a domain which a user input belongs to, an intent, or a parameter (or, a slot) necessary for expressing an intent.

Further, the natural language understanding module 320 may determine a user intent and a parameter by using matching rules divided into a domain, an intent, and a parameter (or, a slot) necessary for identifying an intent.

For example, a domain (e.g.: an alarm) may include a plurality of intents (e.g.: setting of an alarm, release of an alarm, etc.), and one intent may include a plurality of parameters (e.g.: the time, the number of times of repetition, an alarming sound, etc.). Also, a plurality of rules may include one or more essential element parameters. Meanwhile, matching rules may be stored in a natural language understanding database (NLU DB) 323.

The natural language understanding module 320 may identify the meaning of words extracted from a user input by using linguistic characteristics (e.g.: syntactic elements) such as morphemes, phrases, etc., and match the identified meaning of the words with a domain and an intent and determine a user intent.

For example, the natural language understanding module 320 may determine a user intent by calculating how many of the words extracted from a user input are included in each domain and intent. According to an embodiment of the disclosure, the natural language understanding module 320 may determine the parameter of a user input by using words which became a basis for identifying an intent.

Also, the natural language understanding module 320 may determine a user intent by using the natural language understanding database 323 storing linguistic characteristics for identifying the intent of a user input.

In addition, the natural language understanding module 320 may understand a user inquiry by using a private knowledge DB 325. Here, the private knowledge DB 325 may learn the relation among knowledge information based on at least one of a user interaction input into the home appliance 100, sensing information sensed by the home appliance 100, or user information received from an external device. Here, the private knowledge DB 325 may store the relation among knowledge information in the form of ontology.

The conversation manager module 330 may determine whether a user intent identified by the natural language understanding module 320 is clear. For example, the conversation manager module 330 may determine whether a user intent is clear based on whether there is sufficient information on a parameter. Also, the conversation manager module 330 may determine whether a parameter identified at the natural language understanding module 320 is sufficient for performing a task.

According to an embodiment of the disclosure, the conversation manager module 330 may perform a feedback requesting necessary information to a user in case a user intent is not clear. For example, the conversation manager module 330 may perform a feedback requesting information for a parameter for identifying a user intent. Also, the conversation manager module 330 may generate a message for identifying a user inquiry including a text changed by the natural language understanding module 320 and output the message.

The natural language generator (NLG) module 340 may change designated information into the form of a text. The information changed into the form of a text may be in the form of utterance of a natural language. Here, designated information may be information regarding an additional input, information guiding completion of an operation corresponding to a user input, or information guiding an additional input of a user (e.g.: feedback information for a user input).

The text to speech (TTS) module 350 may change information in the form of a text into information in the form of a voice. The text to speech module 350 may receive information in the form of a text from the natural language generator module 340, and change the information in the form of a text into information in the form of a voice and output the information through the speaker. Also, the information in the form of a text may be displayed on the display 180 of the home appliance 100.

Figure 5:
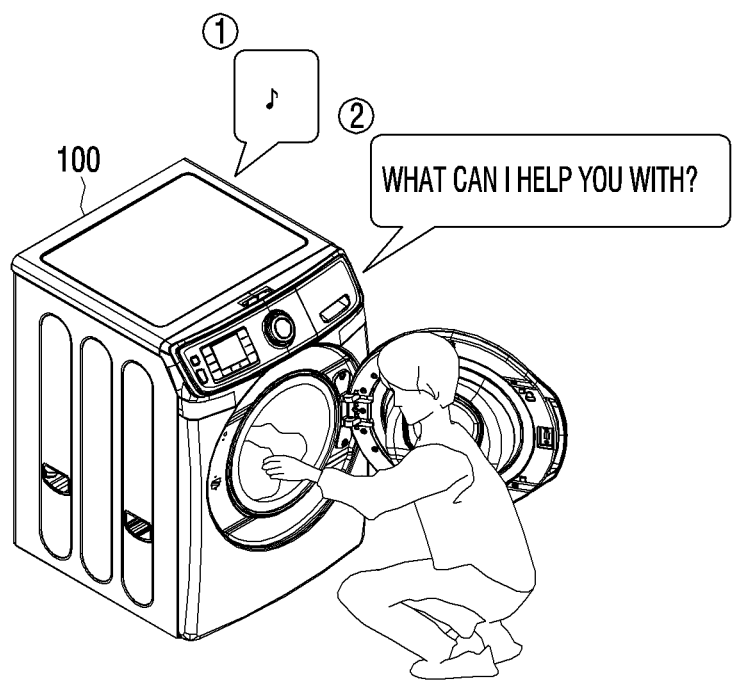
FIG. 5 is a diagram for illustrating a method for initiating a voice recognition mode according to the first embodiment of the disclosure.

FIGS. 5 and 6 are diagrams for illustrating various methods for initiating a voice recognition mode.

If a user action is detected through the sensor 110, the home appliance 100 may operate in the voice recognition mode. For example, if opening or closing of the door is detected through the sensor 110, the home appliance 100 may operate in the voice recognition mode.

Hereinafter, it will be assumed that the home appliance 100 is a washing machine for the convenience of explanation, and the operations of the home appliance 100 will be explained with respect to each of the cases wherein a user action is opening or closing of the door.

FIG. 5 is a diagram for illustrating a method for initiating a voice recognition mode according to the first embodiment of the disclosure. In this embodiment, a case wherein a user action is set as opening of the door is assumed.

If a user accesses a washing machine and utters a trigger command (e.g., "Hi, Bixby"), the home appliance 100 may operate in the voice recognition mode. Then, the home appliance 100 may output an audio signal corresponding to an event of detecting a trigger command. Here, the output audio signal is a simple alarming sound informing that the voice recognition mode was initiated. Referring to FIG. 5, an audio signal corresponding to an event of detecting a trigger command may be a simple alarming sound ① like "ding-dong."

Meanwhile, the user may open the door for putting laundry into the drum of the washing machine. In this case, the home appliance 100 may detect opening of the door and operate in the voice recognition mode. Then, the home appliance 100 may output an audio signal corresponding to an event of opening of the door. Here, the output audio signal is a voice message specifically informing that the voice recognition mode was initiated. Referring to FIG. 5, an audio signal corresponding to an event of opening of the door may be a voice message ② like "What can I help you with?". Meanwhile, a voice message is not limited to the aforementioned example, and it may be a voice message like "The voice recognition mode is initiated."

Then, the home appliance 100 may perform voice recognition for the user voice input while operating in the voice recognition mode, and perform an operation corresponding to the result of voice recognition.

Meanwhile, other than a manner of operating in the voice recognition mode if an event wherein opening of the door is detected occurs, the home appliance 100 may also be implemented in a manner of operating in the voice recognition mode if an event wherein closing of the door is detected occurs. Explanation in this regard will be made below.

FIG. 6 is a diagram for illustrating a method for initiating a voice recognition mode according to the second embodiment of the disclosure. In this embodiment, a case wherein a user action is set as closing of the door is assumed.

Referring to FIG. 6, a user may open the door to put laundry into the drum of the washing machine. However, as opening of the door was not set as a user action, the home appliance 100 may maintain the standby state without operating in the voice recognition mode.

Then, when the user closes the door of the washing machine again, the home appliance 100 may detect closing of the door and operate in the voice recognition mode. Also, the home appliance 100 may output an audio signal corresponding to an event of closing of the door. Here, the output audio signal is a voice message specifically informing that the voice recognition mode is initiated.

As described above, the home appliance 100 may vary the method for initiating the voice recognition mode according to whether an action set as a user action is opening or closing of the door.

Meanwhile, a user action may be set at the time of manufacture. Also, a user action may be set as opening or closing of the door according to a user setting. Specifically, the home appliance 100 may receive input of at least one operation of opening or closing of the door as a user action from a user through the user interface device 150. In this case, the home appliance 100 may set the input operation as a user action, and if the input action is detected, the home appliance 100 may operate in the voice recognition mode.

Meanwhile, if a specific condition is satisfied after the home appliance 100 operates in the voice recognition mode, the home appliance 100 may be converted to the standby mode again. Detailed explanation in this regard will be made below.

Figure 7:
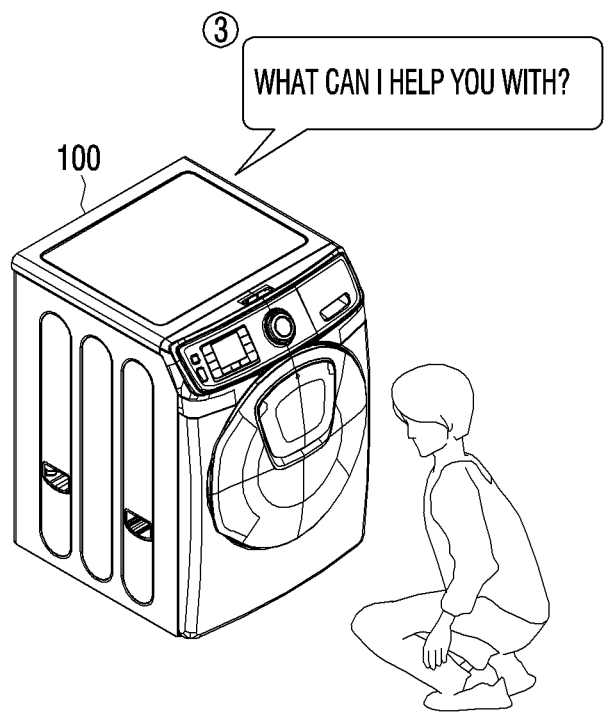
FIG. 7 is a diagram for illustrating a method for converting to a standby mode according to the first embodiment of the disclosure.

FIG. 7 is a diagram for illustrating a method for converting to a standby mode according to the first embodiment of the disclosure. In this embodiment, a case wherein a user action is set as opening of the door is assumed.

Referring to FIG. 7, it can be seen that the user closed the door of the washing machine. When opening of the door is detected, the home appliance 100 may operate in the voice recognition mode, and when closing of the door is detected afterwards, the home appliance 100 may be converted to the standby mode again.

Specifically, if closing of the door is detected while the home appliance 100 performs a voice recognition function based on opening of the door, the home appliance 100 may identify that the user will not utter a voice command anymore, and may be converted from the voice recognition mode to the standby state.

Meanwhile, the home appliance 100 may maintain the voice recognition mode even if closing of the door is detected. Explanation in this regard will be made below with reference to FIG. 8.

FIG. 8 is a diagram for illustrating a method for converting to a standby mode according to the second embodiment of the disclosure.

The home appliance 100 may maintain the voice recognition mode according to whether a control command or an inquiry of a user is included in a voice input through the microphone 120 while operating in the voice recognition mode.

In case a control command or an inquiry of a user is included in a voice input through the microphone 120 while operating in the voice recognition mode, the home appliance 100 may maintain the voice recognition mode and perform an interaction with the user.

For example, referring to FIG. 8, a user may utter a control command such as "Wash the clothes" while the door of the washing machine is opened, and then close the door of the washing machine. In this case, as a control command of a user is included in a voice input through the microphone 120 while operating in the voice recognition mode, the home appliance 100 may maintain the voice recognition mode. Also, the home appliance 100 may perform an interaction with a user by outputting a voice such as "How long will I wash the clothes?".

In contrast, in case a control command or an inquiry of a user is not included in a voice input through the microphone 120 while operating in the voice recognition mode, the home appliance 100 may identify that the user does not intend to use a voice recognition function, and may be converted from the voice recognition mode to the standby state.

Meanwhile, in illustrating and describing FIGS. 7 and 8, it was illustrated and described that the user action is opening of the door, but the embodiments can also be applied in the same manner to a case wherein a user action is closing of the door.

Specifically, in case a user action is closing of the door, the home appliance 100 may operate in the voice recognition mode, and may then be converted from the voice recognition mode to the standby state according to whether a predetermined time has been reached.

Meanwhile, the home appliance 100 may maintain the voice recognition mode according to whether a control command or an inquiry of a user is included in a voice input through the microphone 120 for a predetermined time period.

In case a control command or an inquiry of a user is included in a voice input through the microphone 120 for a predetermined time period, the home appliance 100 may maintain the voice recognition mode and perform an interaction with a user.

In contrast, in case a control command or an inquiry of a user is not included in a voice input through the microphone 120 for a predetermined time period, the home appliance 100 may identify that the user does not intend to use a voice recognition function and may be converted from the voice recognition mode to the standby state.

As described above, if a predetermined event is detected, the home appliance 100 may operate in the voice recognition mode, and if a predetermined condition is satisfied, the home appliance 100 may be converted from the voice recognition mode to the standby state again, and accordingly, a circumstance of misrecognition and power consumption according to maintaining the voice recognition mode consistently can be prevented.

Meanwhile, in illustrating and describing FIGS. 5 to 8, it was assumed that the home appliance is a washing machine, but the type of the home appliance is not limited to a washing machine, and it may be any type if it is a home appliance which includes a door and a sensor detecting opening and closing of the door.

Meanwhile, even if the home appliance 100 operates in the voice recognition mode and receives input of a control command from a user as in the aforementioned method, the home appliance 100 may perform a corresponding operation according to whether the user has authority for an operation corresponding to the control command. A detailed operation in this regard will be described below.

FIG. 9 is a diagram illustrating examples of authority information of each of a plurality of users. If a user voice is input through the microphone 120, the processor 140 may identify the user voice and recognize the user, and if an operation of the home appliance 100 corresponding to the user voice matches the authority information of the recognized user, the processor 140 may perform the operation of the home appliance 100 corresponding to the user voice.

To be more specific, the processor 140 may recognize a user by using a user voice input through the microphone 120 in the voice recognition mode and the speaker recognition model stored in the memory 160.

Then, the processor 140 may identify whether the operation of the home appliance 100 corresponding to the user voice (e.g., a washing operation) matches the authority information of the recognized user by using the authority information of the user stored in the memory 160, and if the authority matches, the processor 140 may perform the operation of the home appliance 100 corresponding to the user voice.

For example, referring to FIG. 9, in case the home appliance 100 is an oven, the home appliance 100 may store authority information for the father, the mother, and the baby who are a plurality of users. According to the illustrated authority information, it can be figured out that the father and the mother have authority for a preheating operation and a baking operation, but the baby does not have authority for a preheating operation and a baking operation.

Accordingly, the processor 140 may identify who the current speaker is among the father, the mother, and the baby in the voice recognition mode, and identify whether the identified user has the authority for the operation corresponding to the control command, and if the user has the authority, the processor 140 may perform the operation, and if the user does not have the authority, the processor 140 may not perform the operation.

Figure 10:
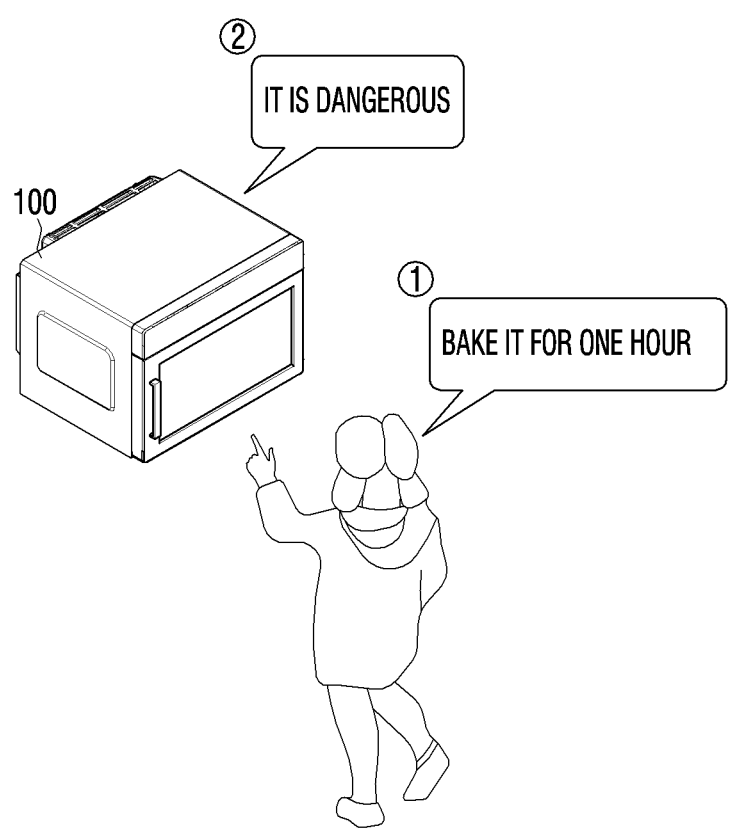
FIG. 10 is a diagram for illustrating execution of operations according to authority information of each of a plurality of users.

FIG. 10 is a diagram for illustrating execution of operations according to authorization information of each of a plurality of users.

According to an embodiment of the disclosure, execution of an operation according to authority information of a user as described above may be performed while being limited to a case wherein a control command identified as a result of a voice recognition is a predetermined operation. Here, a predetermined operation may be an operation requiring safety in performing the operation. For example, in case the home appliance 100 is an oven, the predetermined operation may be a baking operation or a preheating operation.

Specifically, in case an operation corresponding to a user voice input through the microphone 120 is a predetermined operation, the processor 140 may recognize which user the current speaker is among pre-registered users, and identify whether the recognized user has authority for the predetermined operation.

For example, referring to FIG. 10, it can be seen that the baby uttered "Bake it for one hour" ①. In this case, the processor 140 may identify that the control command included in the uttered voice is a baking operation, and is an operation requiring safety. Then, the processor 140 may identify the input voice and recognize that the current speaker is the baby, and identify whether the baby has authority for the baking operation.

However, as the baby does not have authority for the baking operation, the processor 140 may not execute the baking operation. Then, for guiding that the baking operation cannot be performed, the processor 140 may control the speaker 130 to output a voice like "It is dangerous" ②. Alternatively, the processor 140 may display a message guiding that the baking operation cannot be executed through the display 180.

Meanwhile, the processor 140 may receive input of authority for a plurality of operations of the home appliance 100 for each of pre-registered users from a user. For example, with respect to "the baby" who is a pre-registered user, the processor 140 may receive input of a command of granting authority or eliminating authority for the baking operation among the operations of the home appliance 100 through the user interface device 150.

Meanwhile, the operations of the home appliance 100 are not limited to the aforementioned baking operation and preheating operation, and may include various operations according to the characteristics of the home appliance 100.

As described above, the processor performs an operation corresponding to a control command by using authority information of each of a plurality of users, and thus there can be effects of safe use of the home appliance and maintenance of security.

Figure 11:
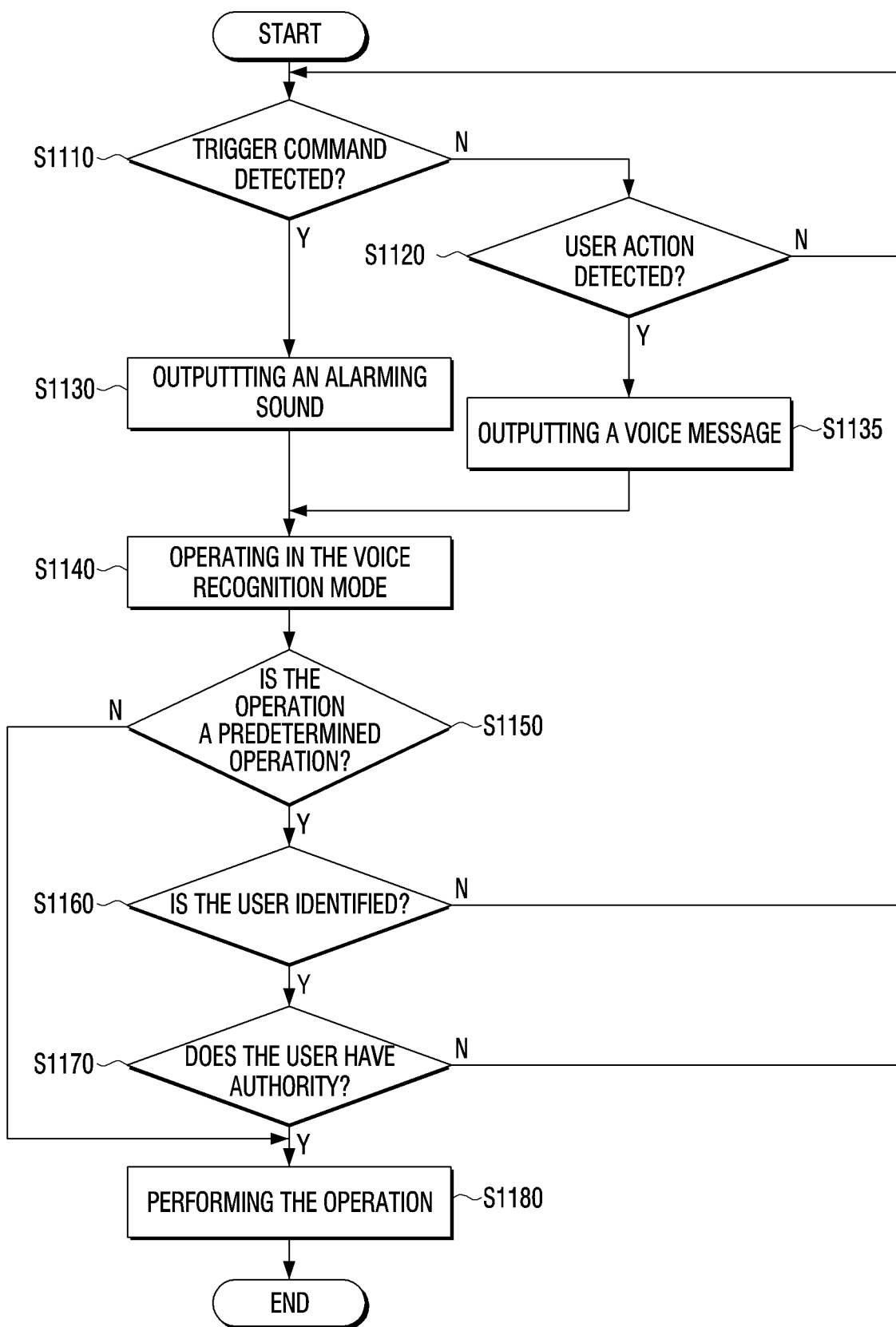
FIG. 11 is a diagram for illustrating an algorithm of a voice recognition mode according to an embodiment of the disclosure.

FIG. 11 is a diagram for illustrating an algorithm of a voice recognition mode according to an embodiment of the disclosure.

Referring to FIG. 11, the processor 140 of the home appliance 100 may detect whether a voice including a trigger command is input through the microphone 120 in a standby state at operation S1110.

If a trigger command is detected at operation S1110-Y, the processor 140 may output an audio signal corresponding to the event wherein a trigger command was detected at operation S1130. Here, an audio signal corresponding to the event wherein a trigger command was detected may be a simple alarming sound.

In contrast, if a trigger command is not detected at operation S1110-N, the processor 140 may identify whether a user action is detected through the sensor 110 at operation S1120.

If a user action is detected at operation S1120-Y, the processor 140 may output an audio signal corresponding to the event wherein a user action was detected at operation S1135. Here, an audio signal corresponding to the event wherein a user action was detected may be a voice message informing that the voice recognition mode is initiated.

In contrast, if a user action is not detected at operation S1120-N, the processor 140 may keep maintaining the standby state, and detect whether a voice including a trigger command is input through the microphone 120 at operation S1110.

Meanwhile, after outputting an alarming sound or a voice message, the processor 140 may operate in the voice recognition mode at operation S1140. Specifically, the processor 140 may perform voice recognition for a voice input through the microphone 120 by using the voice recognition module.

Then, the processor 140 may identify whether the operation corresponding to the result of voice recognition is a predetermined operation at operation S1150.

In case the operation corresponding to the result of voice recognition is not a predetermined operation at operation S1150-N, the corresponding function is an operation for which determination of authority of the user is unnecessary. Thus, the processor 140 may execute the operation corresponding to the result of voice recognition at operation S1180.

In contrast, in case the operation corresponding to the result of voice recognition is a predetermined operation at operation S1150-Y, the processor 140 may recognize the user of the voice input through the microphone 120. Specifically, the processor 140 may recognize the user by identifying the input voice by using the speaker recognition model.

Then, the processor 140 may identify whether the recognized user is a pre-registered user at operation S1160.

In case the recognized user is a pre-registered user at operation S1160-Y, the processor 140 may identify whether the recognized user has authority for the operation corresponding to the result of voice recognition at operation S1170.

In case the recognized user has authority for the operation corresponding to the result of voice recognition, the processor 140 may execute the operation corresponding to the result of voice recognition at operation S1180.

In case the recognized user is not a pre-registered user at operation S1160-N, or the recognized user does not have authority for the operation corresponding to the result of voice recognition at operation S1170-N, the processor 140 may not perform the operation corresponding to the result of voice recognition, and may be converted to the standby state.

Meanwhile, in illustrating and describing FIG. 11, it was illustrated and described that it is identified whether a trigger command is detected, and then it is identified whether a user action is detected. However, in actual implementation, implementation may be made in a way that it is identified whether a user action is detected, and then it is identified whether a trigger command is detected.

Also, in illustrating and describing FIG. 11, it was illustrated and described that an alarming sound or a voice message is output, and then the processor operates in the voice recognition mode. However, in actual implementation, implementation may be made in a way that the processor operates in the voice recognition mode, and then an alarming sound or a voice message is output.

In addition, in illustrating and describing FIG. 11, it was illustrated and described that the processor of the home appliance performs all of the aforementioned operations. However, in actual implementation, implementation may be made in a way that a server performs some of the aforementioned operations of the processor. Detailed explanation in this regard will be made below with reference to FIGS. 12 and 13.

Figure 12:
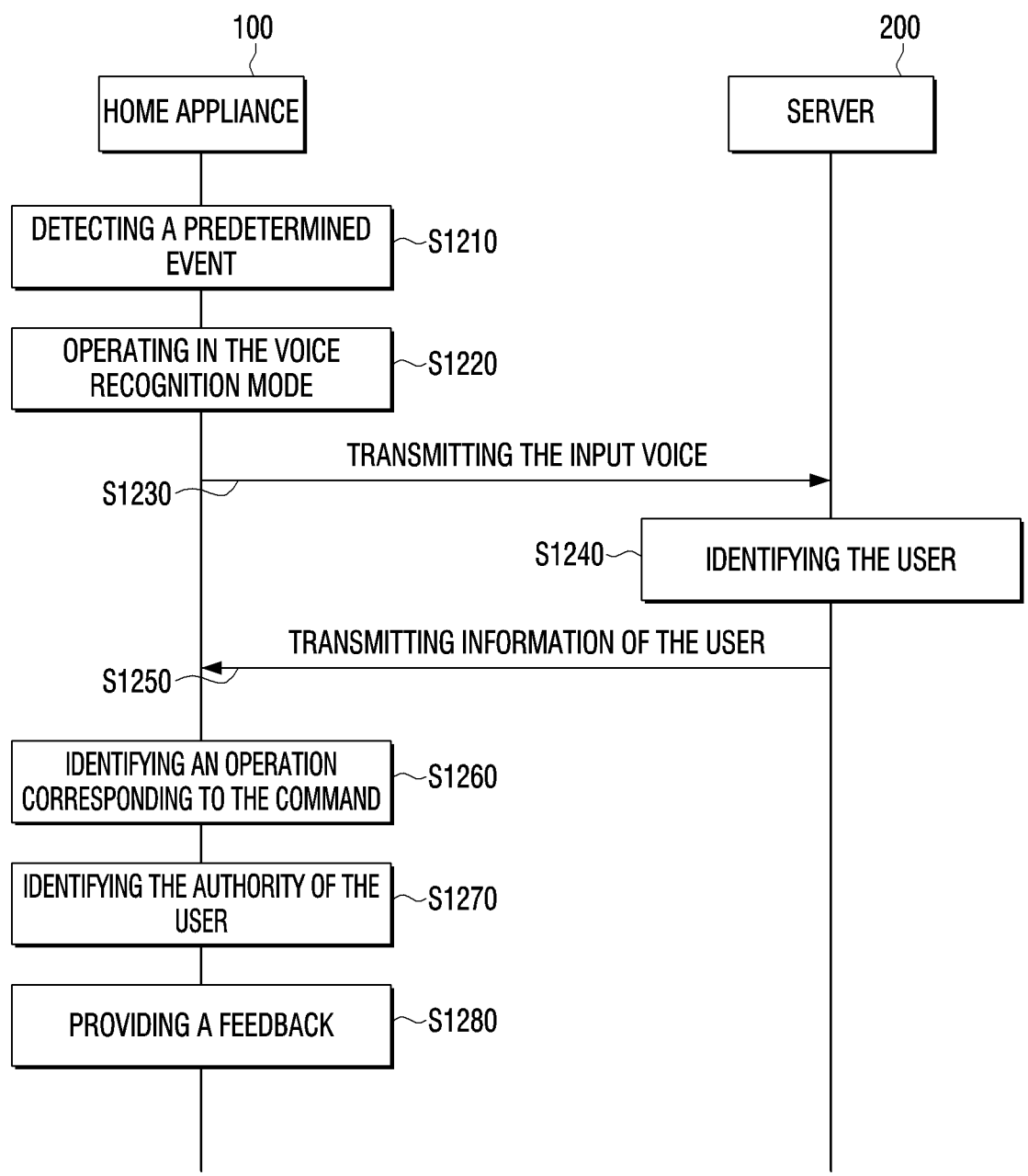
FIG. 12 is a sequence diagram for illustrating execution of operations according to authority information of each of a plurality of users according to the first embodiment of the disclosure.

FIG. 12 is a sequence diagram for illustrating execution of operations according to authorization information of each of a plurality of users according to the first embodiment of the disclosure.

First, the home appliance 100 may detect a predetermined event at operation S1210. Specifically, the home appliance 100 may detect an event wherein a trigger command is input through the microphone 120 or an event wherein a user action is detected through the sensor 110.

Then, the home appliance 100 may operate in the voice recognition mode when a predetermined event is detected at operation S1220. Specifically, the home appliance 100 may output an audio signal corresponding to each predetermined event, and receive input of a user voice through the microphone 120.

Then, the home appliance 100 may transmit voice data corresponding to the input voice to the server 200 at operation S1230.

Then, the server 200 may recognize a user corresponding to the speaker by using the received voice data at operation S1240. Specifically, the server 200 may recognize a user corresponding to the speaker by using the speaker recognition model.

To be more specific, the server 200 may extract a vocal print from the received voice data. Then, the server 200 may compare the plurality of extracted vocal print information with the vocal print information of pre-registered users and identify whether the speaker corresponds to a pre-registered user.

Then, the server 200 may transmit information for the recognized user to the home appliance 100 at operation S1250.

Next, the home appliance 100 may identify an operation corresponding to the voice input through the microphone 120 at operation S1260. Specifically, the home appliance 100 may perform voice recognition for the voice input through the microphone 120 by using the voice recognition module, and identify the control command, and identify the operation of the home appliance 100 corresponding to the control command.

Then, with respect to the operation of the home appliance 100 corresponding to the identified control command, the home appliance 100 may identify whether the recognized user has authority at operation S1270. Specifically, the home appliance 100 may identify whether the recognized user has authority for the operation corresponding to the identified control command by using authority information of each of a plurality of users.

Then, the home appliance 100 may provide a feedback according to whether the recognized user has authority at operation S1280. Specifically, in case the recognized user has authority, the home appliance 100 may execute the operation corresponding to the control command.

In contrast, in case the recognized user does not have authority or the recognized user is not a pre-registered user, the home appliance 100 may not execute the operation corresponding to the control command. In this case, the home appliance 100 may provide guidance regarding impossibility of execution of the operation to the user. For example, the home appliance 100 may output a predetermined guidance message sound or display a predetermined guidance message through the display 180.

In case a home appliance does not include a speaker recognition model as above, the home appliance may recognize a user corresponding to an input voice by using a server that can perform a speaker recognition function.

Meanwhile, a home appliance may not include a voice recognition module as well as a speaker recognition model depending on its kind or usage. Even in this case, speaker recognition and voice recognition may be performed by using a server. Explanation in this regard will be made below.

Figure 13:
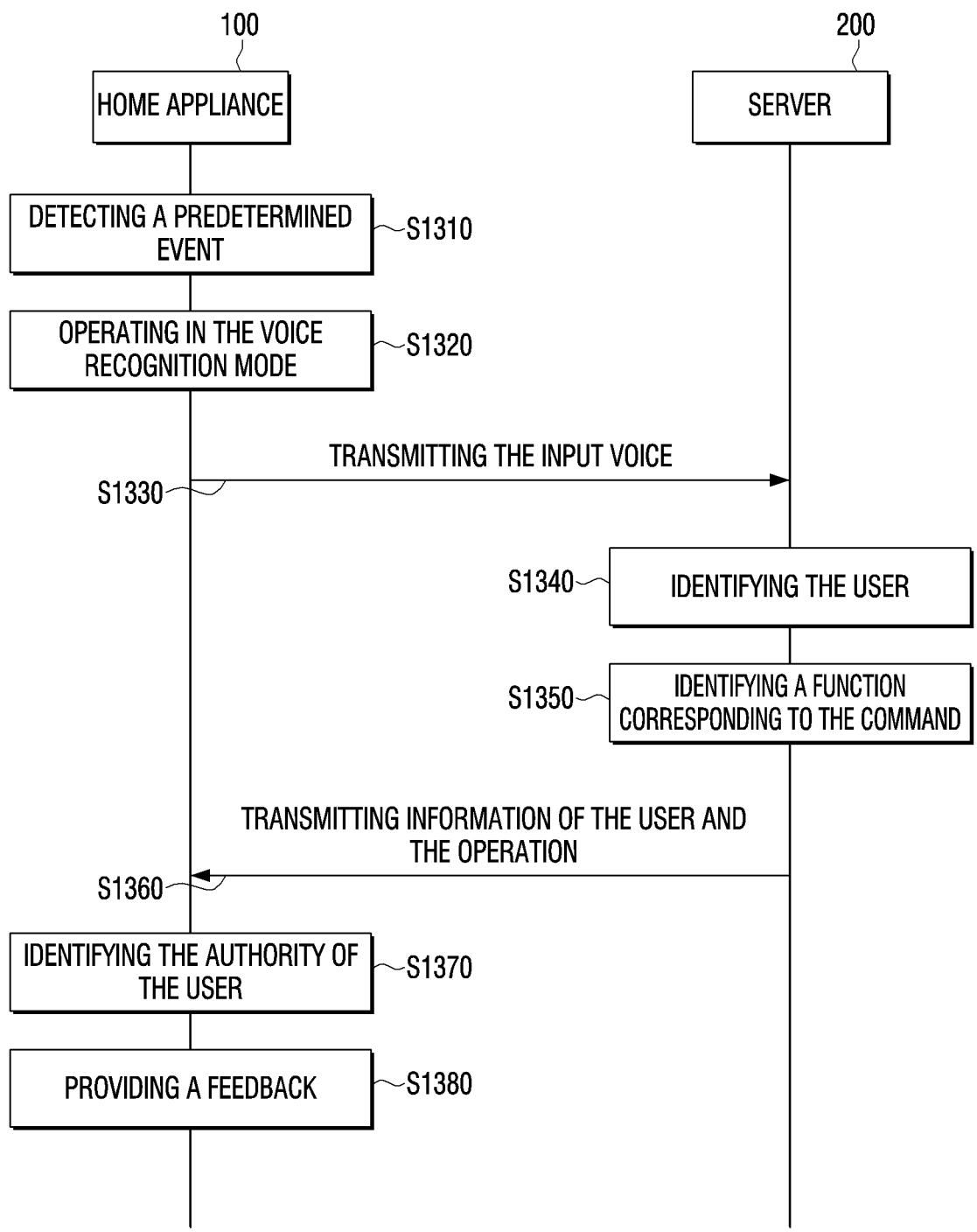
FIG. 13 is a sequence diagram for illustrating execution of operations according to authority information of each of a plurality of users according to the second embodiment of the disclosure.

FIG. 13 is a sequence diagram for illustrating execution of operations according to authorization information of each of a plurality of users according to the second embodiment of the disclosure.

First, the home appliance 100 may detect a predetermined event at operation S1310. Then, when a predetermined event is detected, the home appliance 100 may operate in the voice recognition mode at operation S1320. Specifically, the home appliance 100 may output an audio signal corresponding to each predetermined event, and receive input of a user voice through the microphone 120.

Then, the home appliance 100 may transmit voice data corresponding to the input voice to the server 200 at operation S1330.

Then, the server 200 may recognize a user corresponding to the speaker by using the received voice data at operation S1340. Specifically, the server 200 may recognize a user corresponding to the speaker by using the speaker recognition model.

Next, the server 200 may identify an operation of the home appliance 100 corresponding to the received voice data at operation S1350. Specifically, the server 200 may perform voice recognition for the received voice data by using the voice recognition module, and identify the control command, and identify the operation of the home appliance 100 corresponding to the control command.

Then, the server 200 may transmit information for the recognized user and information on the identified operation to the home appliance 100 at operation S1360.

Also, with respect to the identified operation, the home appliance 100 may identify whether the recognized user has authority at operation S1370. Specifically, the home appliance 100 may identify whether the recognized user has authority for the identified operation by using authority information of each of a plurality of users.

Then, the home appliance 100 may provide a feedback according to whether the recognized user has authority at operation S1380. Specifically, in case the recognized user has authority, the home appliance 100 may execute the identified operation.

In contrast, in case the recognized user does not have authority or the recognized user is not a pre-registered user, the home appliance 100 may not execute the identified operation. In this case, the home appliance 100 may provide guidance regarding impossibility of execution of the operation to the user. For example, the home appliance 100 may output a predetermined guidance message sound or display a predetermined guidance message through the display 180.

Even in a case wherein a home appliance does not include a speaker recognition model and a voice recognition module as above, the home appliance may recognize a user corresponding to an input voice by using a server that can perform a speaker recognition function and a voice recognition function, and identify an operation corresponding to the input voice.

Meanwhile, in illustrating and describing FIG. 13, it was illustrated and described that the home appliance identifies authority information for an operation of the recognized user. However, in actual implementation, implementation may be made in a way that a server performs the aforementioned operation, and transmits the result of determination on whether the recognized user has authority to the home appliance.

Figure 14:
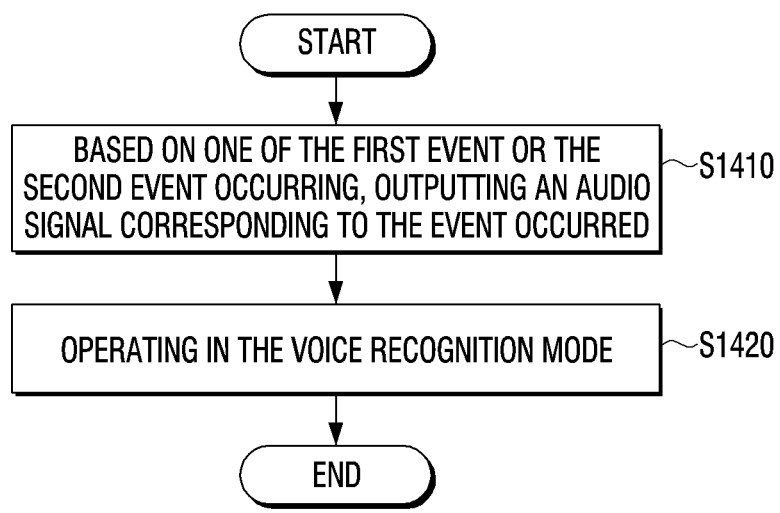
FIG. 14 is a flow chart for illustrating a method for controlling a home appliance according to an embodiment of the disclosure.

FIG. 14 is a flow chart for illustrating a method for a home appliance to recognize a voice according to an embodiment of the disclosure.

Referring to FIG. 14, if one of a first event wherein a user action is detected or a second event wherein a trigger command for initiating the voice recognition mode occurs, an audio signal corresponding to the event occurred is output at operation S1410.

Specifically, it may be identified whether the first event occurred through a sensor detecting a user action. Here, a user action may be set differently according to the type of the sensor detecting the user action.

For example, in case the sensor is a sensor for detecting opening and closing of the door provided on the main body of the home appliance, the user action may be set as opening or closing of the door. Accordingly, if the door is opened or the door is closed, it may be determined that the first event occurred.

As another example, in case the sensor is a motion detection sensor, the user action may be a user access to the home appliance. Accordingly, if a user access to the home appliance is detected, it may be determined that the first event occurred.

Meanwhile, it may be identified whether the second event occurred according to whether a trigger command is included in a voice input through the microphone of the home appliance. Here, a trigger command may be referred to as a wake-up command or a starting command, etc.

Also, an audio signal output may be set differently for each of the first event and the second event.

To be more specific, an audio signal corresponding to the first event may be a voice message informing that the voice recognition mode is initiated. For example, an audio signal corresponding to the first event may be a voice message specifically informing that the voice recognition mode is initiated like "What can I help you with?". Meanwhile, the type of the voice message is not limited to the aforementioned example.

Also, an audio signal corresponding to the second event may be a simple alarming sound. For example, an audio signal corresponding to the second event may be a simple alarming sound like "ding-dong." Meanwhile, the type of the alarming sound is not limited to the aforementioned example.

Then, the home appliance operates in the voice recognition mode at operation S1420. Here, the voice recognition mode means an operation mode wherein a user's inquiry and response input through the microphone are processed as a natural language. Here, the voice recognition mode may be implemented in a manner of directly processing a user's inquiry and response as a natural language by using a voice recognition module. Also, the voice recognition mode may be implemented in a manner of transmitting a voice input through the microphone to a server and receiving the result of voice recognition from the server.

Specifically, voice recognition may be performed for a voice input through the microphone after the home appliance starts to operate in the voice recognition mode.

Then, an operation corresponding to the result of voice recognition may be performed. Meanwhile, before performing the operation corresponding to the result of voice recognition, the authority of the user may be identified, and the operation may be performed according to whether the user has authority.

Specifically, first, when a user voice is input in the voice recognition mode, the user voice may be identified and the user may be recognized. To be more specific, the user may be recognized by using the user voice input in the voice recognition mode and the speaker recognition model stored in the memory.

Then, the authority information of the recognized user may be read from the memory. If the operation corresponding to the user voice matches the read authority information, the operation corresponding to the user voice (i.e., the operation corresponding to the result of voice recognition) may be executed.

In contrast, if the operation corresponding to the user voice does not match the read authority information, or a user corresponding to the input user voice is not identified, the operation corresponding to the user voice may not be executed.

Meanwhile, a decision regarding activation may be input for each of the first event and the second event. Specifically, a decision regarding activation may be input for each of the first event and the second event through the user interface device provided on the home appliance.

If inactivation of the second event is input through the user interface device, the microphone of the home appliance may be turned off in a standby state. Here, a standby state means a state wherein it is detected whether a predetermined event occurred to initiate an operation in the voice recognition mode.

Then, when the first event occurs afterwards, the microphone may be turned on again. As described above, if inactivation of the second event is input, there is no need to detect a trigger command. Accordingly, the microphone is turned off, and power consumption can thereby be prevented.

In contrast, if inactivation of the first event is input through the user interface device, the microphone may be maintained in the turned-on state in the standby state and the sensor detecting a user action may be turned off. As described above, if inactivation of the first event is input, there is no need to detect a user action. Accordingly, the sensor is turned off, and power consumption can thereby be prevented.

Meanwhile, implementation may be made such that the subject detecting a trigger command and the subject operating in the voice recognition mode are different from each other. Specifically, the home appliance may include a first processor detecting a trigger command and a second processor for operating in the voice recognition mode.

Also, the first processor may maintain the turned-on state in the standby state. In addition, the first processor may recognize a trigger command included in a user voice.

Further, when the first processor recognizes a trigger command, the first processor may turn on the second processor. Specifically, if the standby state of the second processor is maintained for over a predetermined time period, the state of the second processor may be changed from a turned-on state to a turned-off state and the state may be maintained. Also, when the first processor recognizes a trigger command, the first processor may turn on the second processor.

Accordingly, in the method for controlling a home appliance according to the disclosure, even if a user does not utter a trigger command, if a user action by which it is predicted that a user is going to utter a voice command is detected, a home appliance operates in the voice recognition mode. Accordingly, there is an effect that the inconvenience that a user necessarily has to utter a starting command is resolved. Also, when a user action is detected, a voice message informing that the voice recognition mode is initiated is output, and accordingly, it can be specifically informed that a home appliance will operate in the voice recognition mode even when it is uncertain whether the user intended the voice recognition mode of the home appliance, and the user may be induced to utter a control command or an inquiry. In addition, if an event wherein a trigger command is detected is inactivated, the microphone is turned off in the standby state, and if an event wherein a user action is detected is inactivated, the sensor is turned off in the standby state, and accordingly, power consumed for unnecessary components in the standby state can be reduced.

The method for recognizing a voice as in FIG. 14 may be executed in a home appliance having the configurations as in FIG. 2 or FIG. 3, and may also be executed in a home appliance having a different configuration.

Also, the aforementioned method for controlling a home appliance may be implemented as at least one execution program for executing the aforementioned method for controlling a home appliance, and such an execution program may be stored in a non-transitory computer readable medium.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Also, while preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are within the scope of the descriptions of the claims.

What is claimed is:

1. A home appliance comprising:
   a user interface through which it is settable whether a voice recognition mode allowing voice control of the home appliance is to be initiated in response to a user action being detected through a sensor, and whether the voice recognition mode is to be initiated in response to a trigger command for initiating the voice recognition mode being input through a microphone; and
   at least one processor configured to:
   in response to the user action being detected through the sensor while the voice recognition mode is set to be initiated in response to the user action being detected through the sensor, perform control to output an audio signal corresponding to the detection of the user action through a speaker, and to initiate the voice recognition mode, and
   in response to the trigger command for initiating the voice recognition mode being input through the microphone while the voice recognition mode is set to be initiated in response to the trigger command for initiating the voice recognition mode being input through the microphone, perform control to output an audio signal corresponding to the input of the trigger command through the speaker, and to initiate the voice recognition mode,
   wherein the audio signal corresponding to the detection of the user action is different than the audio signal corresponding to the input of the trigger command.

2. The home appliance of claim 1, wherein
   the home appliance includes a door and the sensor,
   the sensor is to detect opening of the door, and
   the user action is the opening of the door.

3. The home appliance of claim 1, wherein
   the sensor is a motion detector, and
   the user action is user access of the home appliance indicated by motion of the user detected by the sensor.

4. The home appliance of claim 1, wherein
   the audio signal corresponding to the detection of the user action is a voice message informing that the voice recognition mode is initiated, and
   the audio signal corresponding to the input of the trigger command is an alarming sound.

5. The home appliance of claim 4, wherein the at least one processor is configured to:
   turn the microphone on or off based on whether the voice recognition mode is set to be initiated in response to the trigger command for initiating the voice recognition mode being input through the microphone.

6. The home appliance of claim 5, wherein the at least one processor is configured to:
turn the sensor on or off based on whether the voice recognition mode is set to be initiated in response to the user action being detected through the sensor.

7. The home appliance of claim 1, wherein
the at least one processor includes first and second processors,
the first processor is configured to recognize the trigger command input through the microphone and to output a signal to the second processor in response to the trigger command being recognized, and
the second processor is configured to be turned off in a standby state and to receive the signal output by the first processor when turned off in the standby state, and, when receiving the signal output by the first processor when turned off in the standby state, to be turned on and then operate in the voice recognition mode.

8. The home appliance of claim 1, further comprising:
a memory configured to store authority information for each user of the home appliance,
wherein the at least one processor executes the instructions to:
based on a user voice being input through the microphone in the voice recognition mode, recognize the user by identifying the user voice, and based on an operation corresponding to the user voice matching the authority information of the recognized user, perform the operation.

9. A method comprising:
by at least one processor of a home appliance that includes a user interface through which it is settable whether a voice recognition mode allowing voice control of the home appliance is to be initiated in response to a user action being detected through a sensor, and whether the voice recognition mode is to be initiated in response to a trigger command for initiating the voice recognition mode being input through a microphone,
in response to the user action being detected through the sensor while the voice recognition mode is set to be initiated in response to the user action being detected through the sensor, perform control to output an audio signal corresponding to the detection of the user action through a speaker, and to initiate the voice recognition mode, and
in response to the trigger command for initiating the voice recognition mode being input through the microphone while the voice recognition mode is set to be initiated in response to the trigger command for initiating the voice recognition mode being input through the microphone, perform control to output an audio signal corresponding to the input of the trigger command through the speaker, and to initiate the voice recognition mode,
wherein the audio signal corresponding to the detection of the user action is different than the audio signal corresponding to the input of the trigger command.

10. The method of claim 9, wherein:
the sensor is to detect opening of a door of the home appliance, and
the user action is the opening of the door.

11. The method of claim 9, wherein:
the sensor is a motion detector, and
the user action is user access of the home appliance indicated by motion of the user detected by the sensor.

12. The method of any one of claims 9, wherein
the audio signal corresponding to the detection of the user action is a voice message informing that the voice recognition mode is initiated, and
the audio signal corresponding to the input of the trigger command is an alarming sound.

13. The method of claim 12, further comprising:
by the at least one processor of the home appliance,
turning the microphone on or off based on whether the voice recognition mode is set to be initiated in response to the trigger command for initiating the voice recognition mode being input through the microphone.

14. The method of claim 13, further comprising:
by the at least one processor of the home appliance,
turning the sensor on or off based on whether the voice recognition mode is set to be initiated in response to the user action being detected through the sensor.

15. The method of claim 9, wherein the at least one processor includes a first processor and a second processor, and the method further comprising:
recognizing, by the first processor, the trigger command input through the microphone and outputting, while the second processor is turned off in a standby state, a signal in response to the trigger command being recognized, and
by the second processor,
receiving, while turned off in the standby state, the signal output by the first processor, then turning on, and then operating in the voice recognition mode.

16. The method of claim 9, further comprising:
by the at least one processor of the home appliance,
based on a user voice being input through the microphone in the voice recognition mode, recognizing the user by identifying the user voice;
reading authority information of the recognized user from a memory; and
based on an operation corresponding to the user voice matching the authority information, performing the operation.

17. A non-transitory recording medium storing a program that, when executed by at least one processor of a home appliance that includes a user interface through which it is settable whether a voice recognition mode allowing voice control of the home appliance is to be initiated in response to a user action being detected through a sensor, and whether the voice recognition mode is to be initiated in response to a trigger command for initiating the voice recognition mode being input through a microphone, causes the following to be performed:
in response to the user action being detected through the sensor while the voice recognition mode is set to be initiated in response to the user action being detected through the sensor, perform control to output an audio signal corresponding to the detection of the user action through a speaker, and to initiate the voice recognition mode, and
in response to the trigger command for initiating the voice recognition mode being input through the microphone while the voice recognition mode is set to be initiated in response to the trigger command for initiating the voice recognition mode being input through the microphone, perform control to output an audio signal corresponding to the input of the trigger command through the speaker, and to initiate the voice recognition mode, wherein the audio signal corresponding to the detection of the user action is different than the audio signal corresponding to the input of the trigger command.

* * * * *

UNITED STATES PATENT AND TRADEMARK OFFICE
CERTIFICATE OF CORRECTION

PATENT NO. : 11,551,686 B2
APPLICATION NO. : 16/859330
DATED : January 10, 2023
INVENTOR(S) : Changkyu Ahn et al.

It is certified that error appears in the above-identified patent and that said Letters Patent is hereby corrected as shown below:

In the Claims

Column 24, Line 1 In Claim 12, delete "any one of claims" and insert --claim--.

Signed and Sealed this
Seventh Day of March, 2023

Katherine Kelly Vidal
*Director of the United States Patent and Trademark Office*